(12) United States Patent  (10) Patent No.: US 8,970,978 B1
Knigge et al.  (45) Date of Patent: Mar. 3, 2015

(54) DISK DRIVE DETECTING HEAD TOUCHDOWN BY APPLYING DC+AC CONTROL SIGNAL TO FLY HEIGHT ACTUATOR

(71) Applicant: Western Digital Technologies, Inc., Irvine, CA (US)

(72) Inventors: Bernhard E. Knigge, San Jose, CA (US); Stanley H. Shepherd, Morgan Hill, CA (US); Noureddine Kermiche, Dana Point, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/657,016

(22) Filed: Oct. 22, 2012

(51) Int. Cl.
G11B 5/60 (2006.01)
(52) U.S. Cl.
CPC .................... *G11B 5/6076* (2013.01)
USPC ............................................. 360/55; 360/75
(58) Field of Classification Search
None
See application file for complete search history.

(56) References Cited

U.S. PATENT DOCUMENTS

| | | | |
|---|---|---|---|
| 5,168,413 A | 12/1992 | Coker et al. |
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |

(Continued)

OTHER PUBLICATIONS

Bernhard Knigge, et al., "Write Protrusion Modulation for Sub—Nanometer Contact Interference", Proceedings of WTC 2005, 2005 World Tribology Congress III, Washington, D.C., Sep. 12-16, 2005.

*Primary Examiner* — Wayne Young
*Assistant Examiner* — James L Habermehl (57) ABSTRACT

A disk drive is disclosed comprising a head actuated over a disk, and a dynamic fly height (DFH) actuator operable to control a fly height of the head over the disk. A DFH control signal is applied to the DFH actuator to decrease the fly height of the head, wherein the DFH control signal comprises a DC component and an AC component comprising an excitation frequency. A touchdown metric is measured over an interval, and the head contacting the disk is detected in response to a frequency component of the touchdown metric at the excitation frequency.

30 Claims, 4 Drawing Sheets

(56) References Cited

U.S. PATENT DOCUMENTS

| | | |
|---|---|---|
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,016,139 B2 * | 3/2006 | Baumgart et al. .............. 360/75 |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |

(56) References Cited

U.S. PATENT DOCUMENTS

| | | |
|---|---|---|
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,158,325 B1 | 1/2007 | Hu et al. |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,233,451 B2 * | 6/2007 | Baumgart et al. ............... 360/75 |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,508,618 B1 | 3/2009 | Herbst et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,583,466 B2 | 9/2009 | Kermiche et al. |
| 7,596,797 B1 | 9/2009 | Kapner, III et al. |
| 7,599,139 B1 | 10/2009 | Bombet et al. |
| 7,605,996 B2 | 10/2009 | Baumgart et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,660,068 B1 * | 2/2010 | Baumgart et al. ............... 360/75 |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,804,657 B1 | 9/2010 | Hogg et al. |
| 7,813,954 B1 | 10/2010 | Price et al. |
| 7,827,320 B1 | 11/2010 | Stevens |
| 7,830,634 B2 * | 11/2010 | Chen et al. ............... 360/75 |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 * | 11/2011 | Knigge et al. ............... 360/75 |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,085,490 B2 * | 12/2011 | Franca-Neto et al. ............... 360/75 |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |

(56) References Cited

U.S. PATENT DOCUMENTS

| | | | |
|---|---|---|---|
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 2007/0253092 A1 | 11/2007 | Ikai et al. |
| 2009/0113702 A1 | 5/2009 | Hogg |
| 2009/0257145 A1 | 10/2009 | Tsuyama |
| 2010/0157454 A1 | 6/2010 | Chen et al. |
| 2010/0225310 A1* | 9/2010 | Sudou ............................ 324/213 |
| 2010/0259850 A1* | 10/2010 | Miyake et al. ............ 360/234.7 |
| 2010/0306551 A1 | 12/2010 | Meyer et al. |
| 2011/0157736 A1 | 6/2011 | Contreras et al. |
| 2011/0226729 A1 | 9/2011 | Hogg |
| 2011/0235207 A1 | 9/2011 | Yang |
| 2012/0002319 A1 | 1/2012 | Kondo |
| 2012/0120982 A1* | 5/2012 | Anaya-Dufresne et al. .. 374/141 |
| 2012/0159042 A1 | 6/2012 | Lott et al. |
| 2012/0201108 A1* | 8/2012 | Zheng et al. ............... 369/13.26 |
| 2012/0218659 A1* | 8/2012 | Liu et al. ......................... 360/55 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0094107 A1* | 4/2013 | Setiadi et al. .............. 360/234.3 |
| 2014/0009851 A1* | 1/2014 | Budde ............................ 360/59 |

* cited by examiner

DISK DRIVE DETECTING HEAD TOUCHDOWN BY APPLYING DC+AC CONTROL SIGNAL TO FLY HEIGHT ACTUATOR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate setting for the DFH control signal (e.g., appropriate current applied to a heater) that achieves the target fly height for the head.

DETAILED DESCRIPTION

Figure 1A:
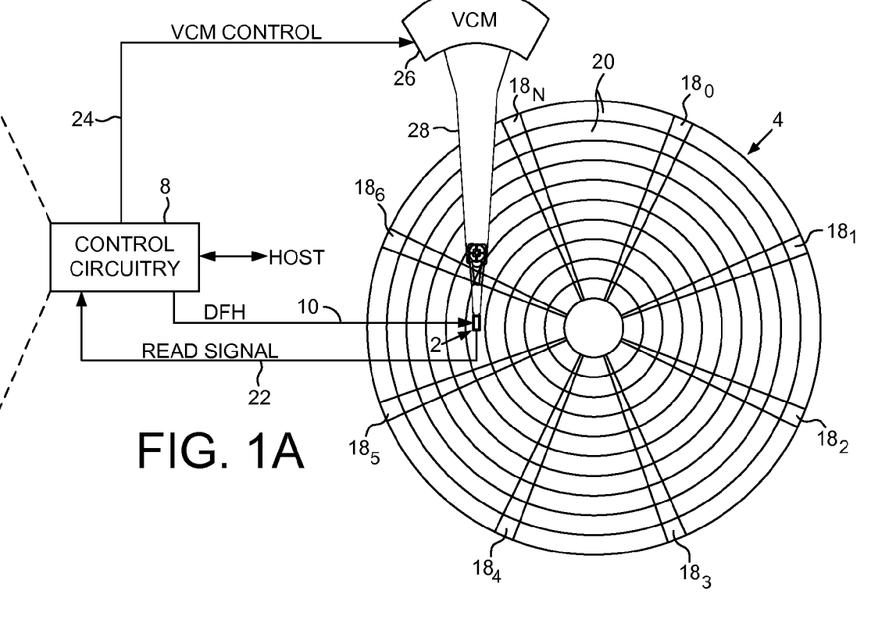
FIGS. 1A and 1B show a head actuated over a disk, wherein the head comprises a dynamic fly height (DFH) actuator operable to control a fly height of the head.
Figure 1B:
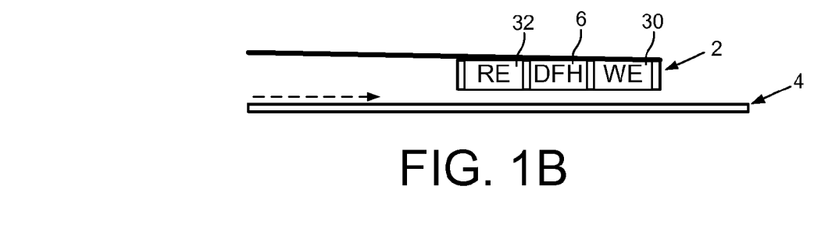

FIG. 1A shows a disk drive according to an embodiment of the present invention comprising a head 2 actuated over a disk 4, wherein the head 2 comprises a dynamic fly height (DFH) actuator 6 (FIG. 1B) operable to control a fly height of the head 2 over the disk 4. The disk drive further comprises control circuitry 8 operable to execute the flow diagram of FIG. 1C, wherein a DFH control signal 10 is applied to the DFH actuator to decrease the fly height of the head (bock 12), wherein the DFH control signal 10 comprises a DC component and an AC component comprising an excitation frequency (FIG. 1D). A touchdown metric is measured over an interval (block 14), and the head contacting the disk is detected in response to a frequency component of the touchdown metric at the excitation frequency (block 16).

In the embodiment of FIG. 1A, the disk 4 comprises embedded servo sectors $18_0$-$18_N$ that define a plurality of servo tracks 20, wherein data tracks are defined relative to the servo tracks (at the same or different radial density). The control circuitry 8 processes a read signal 22 emanating from the head 2 to demodulate the servo sectors $18_0$-$18_N$ into an estimated position. The estimated position is subtracted from a reference position to generate a position error signal (PES) representing an error between the actual position of the head and a target position relative to a target track. The PES is filtered using a suitable compensation filter to generate a control signal 24 applied to a voice coil motor (VCM) 26 which rotates an actuator arm 28 about a pivot in order to actuate the head 2 radially over the disk 4 in a direction that reduces the PES. The servo sectors $18_0$-$18_N$ may comprise any suitable position information, such as a track address for coarse positioning and servo bursts for fine positioning. The servo bursts may comprise any suitable pattern, such as an amplitude-based servo pattern (e.g., a quadrature servo pattern), or a suitable phase-based servo pattern.

Any suitable DFH actuator 6 may be employed in the embodiments of the present invention, such as a heater which controls fly height through thermal expansion, or a piezoelectric (PZT) actuator. In addition, the DFH control signal 10 applied to the DFH actuator 6 may comprise any suitable signal, such as a current or a voltage applied to the DFH actuator 6. In one embodiment, an operating setting for the DFH control signal 10 is generated based on the DFH control signal 10 that causes the head to contact the disk surface (touchdown). The accuracy of the operating setting is therefore dependent on the accuracy of the touchdown detection. Accordingly, in an embodiment of the present invention, employing a DFH control signal 10 comprising a DC component and an AC component improves the accuracy of the measured touchdown metric, thereby improving the accuracy of the operating setting for the DFH control signal 10.

The head 2 in the embodiment shown in FIG. 1B comprises a suitable write element 30 (e.g., a coil) and a suitable read element 32 (e.g., a magnetoresistive element). In one embodiment, the operating setting for the DFH control signal 10 may be configured for the write element 30 during write operations and configured differently for the read element 32 during read operations. Each write/read setting for the DFH control signal 10 may be configured by backing off the setting for the DFH control signal 10 that causes the touchdown event.

Figure 2A:
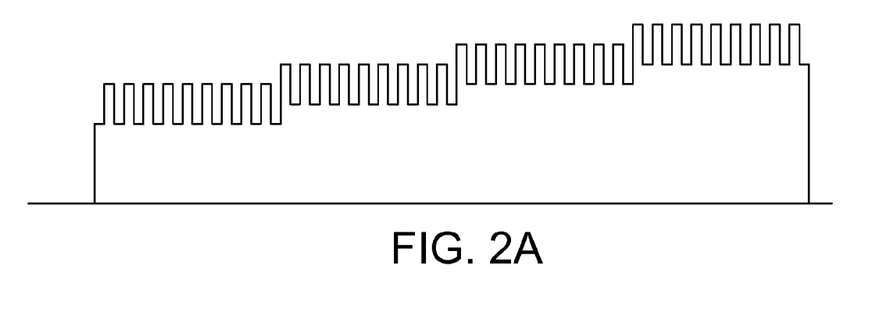
FIG. 2A shows an embodiment of the present invention wherein the DC component of the DFH control signal is incrementally increased until a touchdown event is detected in response to a touchdown metric at the excitation frequency.

The DFH control signal 10 may comprise any suitable waveform, wherein in an embodiment shown in FIG. 2A, the DFH control signal 10 comprises an AC component added to a DC component. In the embodiment shown in FIG. 2A, the DC component is increased (without increasing the amplitude of the AC component) until the touchdown metric indicates a touchdown event. The DC component may be increased based on any suitable function, such as a step increase of the DC component as shown in FIG. 2A. The duration of each step may last any suitable interval, such as one or more revolutions of the disk, or a partial revolution of the disk.

In one embodiment, the frequency of the AC component may equal an integer multiple of the disk rotation frequency such that the AC component is substantially synchronous with the disk rotation frequency. In another embodiment, the frequency of the AC component may equal a non-integer multiple of the disk rotation frequency so that the AC component is intentionally non-synchronous with the disk rotation frequency. In yet another embodiment, the phase of the AC component may be dithered to achieve a non-synchronous relationship between the frequency of the AC component and the rotation frequency of the disk. In the embodiment shown in FIG. 2A, the phase of the AC component may be adjusted at each step increment of the DC component, or the phase of the AC component may be adjusted within the step interval.

When the DC component is increased sufficiently to cause the head to contact the disk, the touchdown event will manifest in a frequency component of the touchdown metric at the excitation frequency of the AC component. The touchdown metric may be evaluated at any excitation frequency of the AC component, such as at the fundamental frequency of the AC component or at a sub-harmonic or harmonic frequency of the AC component. In other embodiments, the touchdown event may be detected by evaluating the touchdown metric at multiple excitation frequencies, such as the fundamental and a harmonic frequency. Any suitable technique may be employed to measure the frequency component of the touchdown metric at the excitation frequency, such as by computing a Fourier transform at the excitation frequency.

Any suitable touchdown metric may be measured in the embodiments of the present invention, such as the current driving the spindle motor, a time period between consecutive servo sectors (wedge-to-wedge time), the PES generated by the servo control system for position the head over the disk, a control signal applied to a variable gain amplifier (VGA) that tracks an amplitude of the read signal, the amplitude of servo bursts, or a sensor signal emanating from a suitable touchdown sensor, such as a tunneling sensor, a tribo-current sensor, or an acoustic emission sensor. Regardless as to the touchdown metric, employing a DFH control signal comprising a DC component and an AC component causes a response in the touchdown metric at an excitation frequency of the AC component that more accurately reflects when the head contacts the disk, thereby achieving a more accurate target fly height during normal operations.

Figure 2B:
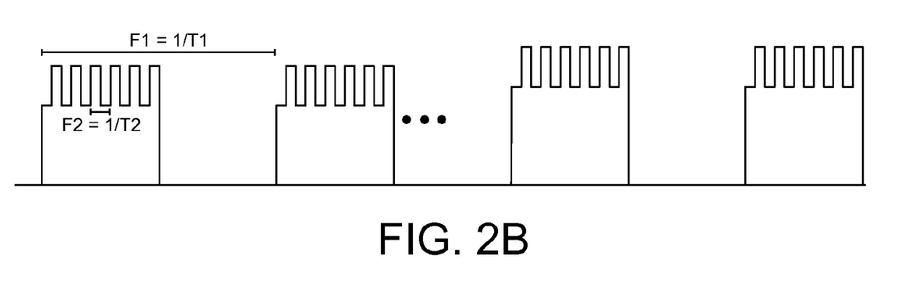
FIG. 2B shows an embodiment of the present invention wherein the DFH control signal comprises a plurality of pulses, wherein each pulse comprises a DC component and an AC component.

FIG. 2B illustrates an embodiment of the present invention wherein the DFH control signal comprises a plurality of pulses, wherein each pulse comprises a DC component and an AC component. In this embodiment, the DFH control signal is substantially zero for at least part of the interval while measuring the touchdown metric. Also in the embodiment of FIG. 2B, the DFH control signal comprises a first periodic signal (the periodic pulses) comprising a first frequency combined with a second periodic signal (the AC component added to each pulse) comprising a second frequency. The head contacting the disk is detected in response to a first frequency component of the touchdown metric at a first excitation frequency and a second frequency component of the touchdown metric at a second excitation frequency. Similar to the embodiments described above, the first and second excitation frequencies may comprise any suitable frequency, such as a fundamental frequency, a sub-harmonic frequency, or a harmonic frequency of the respective periodic signal.

In the embodiment of FIG. 2B, the pulses cycle at a frequency F1, whereas the AC component added to each pulse cycles at a frequency F2 significantly higher than F1. In one embodiment, the lower frequency pulses induce a response in the touchdown metric at a corresponding excitation frequency that indicates a particular type of touchdown event, such as a friction response of the head contacting the disk which is a relatively slow response. In contrast, the higher frequency AC component added to each pulse may induce a response in the touchdown metric indicative of a different type of response, such as the head bouncing on the disk which is typically a faster response. Accordingly, in this embodiment employing a DFH control signal comprising two periodic signals may enable the control circuitry to detect and discriminate between multiple types of touchdown events.

Figure 3:
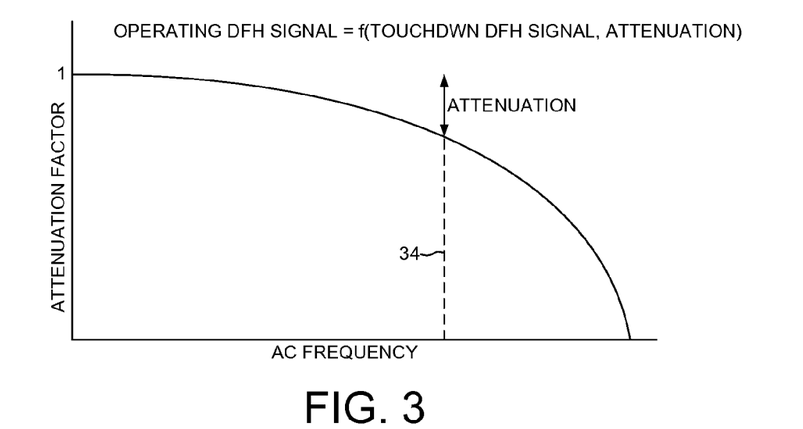
FIG. 3 shows an embodiment of the present invention wherein a frequency of the AC component of the DFH control signal is high enough to attenuate a response of the DFH actuator.

In one embodiment, the AC component of the DFH control signal may comprise a periodic signal generated at a predetermined frequency that is high enough to attenuate a response of the DFH actuator. This embodiment is illustrated in FIG. 3 wherein the response of the DFH actuator is attenuated by an attenuation factor depending on the frequency of the AC component of the DFH control signal. At low frequencies of the AC component, there is no attenuation in the response of the DFH actuator (the attenuation factor is unity). As the frequency of the AC component increases, the response of the DFH actuator rolls off similar to a low pass filter. In certain embodiments, it may be desirable to employ an AC component at a sufficiently high frequency 34 to detect particular types of touchdown events (e.g., head bounce). However, since a high frequency 34 AC component may attenuate the response of the DFH actuator, in one embodiment the resulting attenuation is taken into account when selecting the operating setting(s) for the DFH control signal. For example, if the frequency of the AC component causes a twenty-five percent attenuation of the DFH actuator response, the operating setting for the DFH control signal is further reduced based on this attenuation factor since the operating DFH control signal is typically generated at a lower frequency that causes less (or no) attenuation of the DFH actuator response.

Figure 4A:
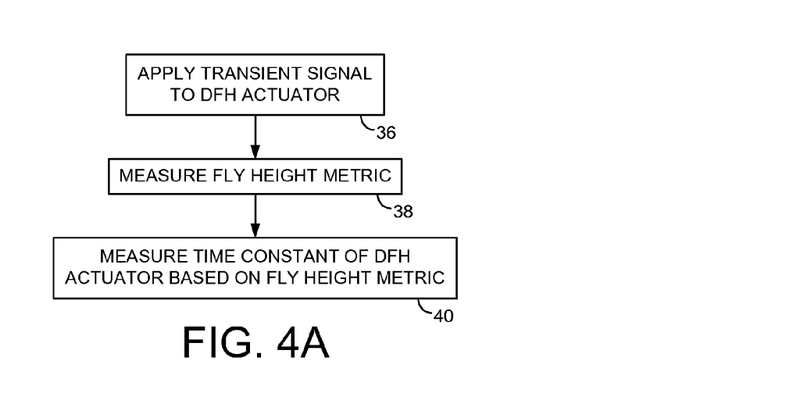
FIG. 4A is a flow diagram according to an embodiment of the present invention for measuring a time constant of the DFH actuator based on a fly height metric, and thereby calibrating the attenuation of the DFH actuator response at the frequency of the AC component of the DFH control signal.

Any suitable technique may be employed to measure the frequency response of the DFH actuator. In one embodiment illustrated in the flow diagram of FIG. 4A, a transient signal is applied to the DFH actuator (block 36), a fly height metric is measured (block 38), and a time constant of the DFH actuator is measured in response to the measured fly height metric (block 40). The measured time constant may then be used to estimate the bandwidth of the DFH actuator, which in turn may be used to estimate the attenuation factor at the frequency of the AC component in the DFH control signal.

Figure 4B:
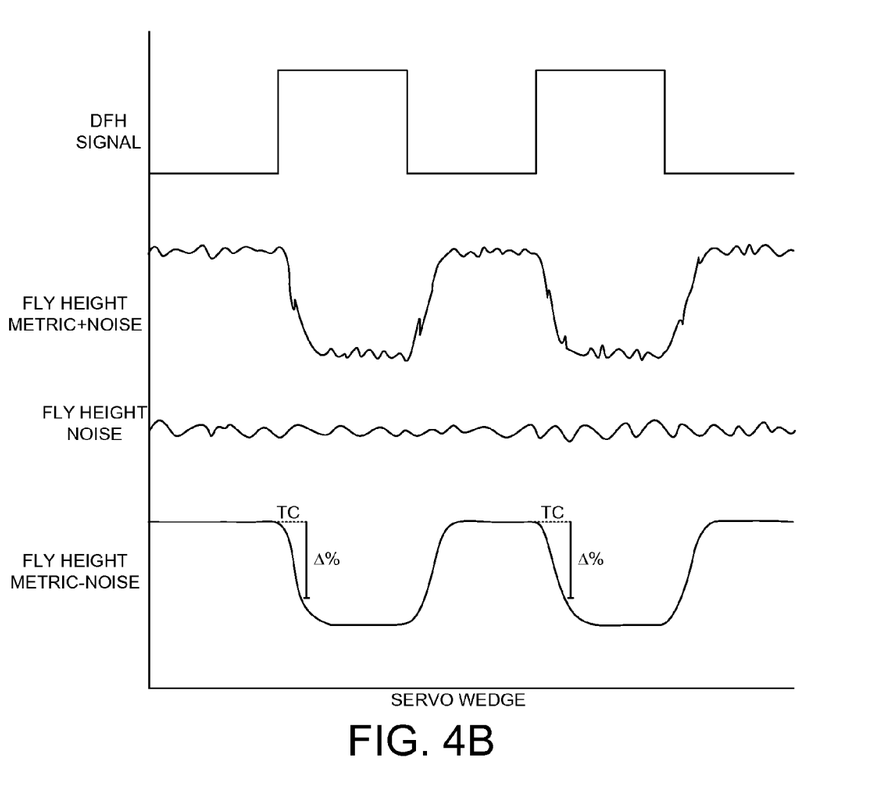
FIG. 4B shows an embodiment of the present invention for measuring the time constant of the DFH actuator based on a fly height metric.

Any suitable transient signal may be applied to the DFH actuator at block 36, wherein in an embodiment shown in FIG. 4B, a square wave is applied to the DFH actuator. A resulting fly height metric is measured over one or more disk revolutions (or partial disk revolution) that may include some level of noise due, for example, to topography variations of the disk surface. The fly height metric is measured over one or more disk revolutions (or partial disk revolution) without applying the square wave to the DFH actuator in order to measure the noise (topography variations) which is subtracted from the noisy fly height metric to generate a fly height metric that more accurately reflects the response of the DFH actuator. The time constant of the DFH actuator is then estimated by measuring the time required for the fly height metric to decay by a predetermined percentage as shown in FIG. 4B. In one embodiment, the decay time may be measured for multiple square wave cycles, and then averaged to improve the accuracy of the estimated time constant.

Any suitable fly height metric may be measured when estimating the time constant of the DFH actuator. In one embodiment, the fly height metric is generated in response to the read signal, such as an amplitude of the read signal, or the gain setting of a variable gain amplifier that attempts to maintain the amplitude of the read signal constant at the input to a read channel. In other embodiments, a fly height metric may be generated by writing a periodic pattern on the disk, and then evaluating the fundamental and harmonics of the resulting read signal (a harmonic ratio technique based on the Wallace spacing equation). In yet other embodiments, a suitable fly height sensor, such as a thermoresistive sensor, capacitive sensor, or tunneling sensor, may be employed that transduces the fly height into a suitable signal representing the fly height metric.

Figure 1C:
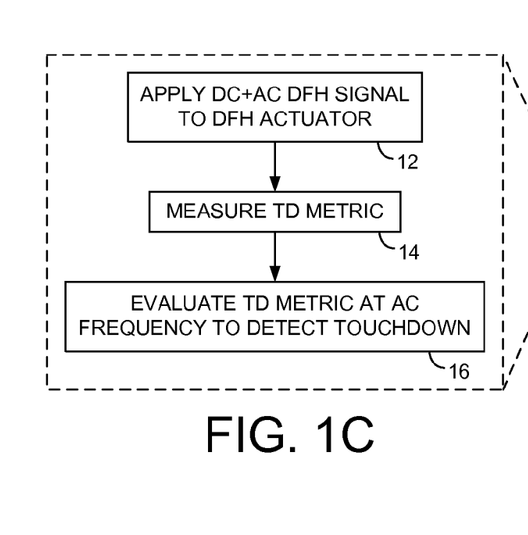
FIG. 1C is a flow diagram according to an embodiment of the present invention wherein a DFH control signal applied to the DFH actuator comprises a DC component and an AC component comprising an excitation frequency.
Figure 1D:
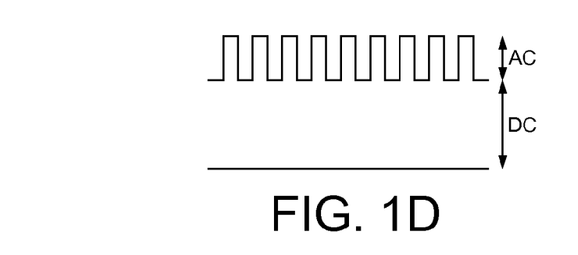
FIG. 1D shows a DFH control signal according to an embodiment of the present invention comprising a DC component and an AC component.
Figure 5A:
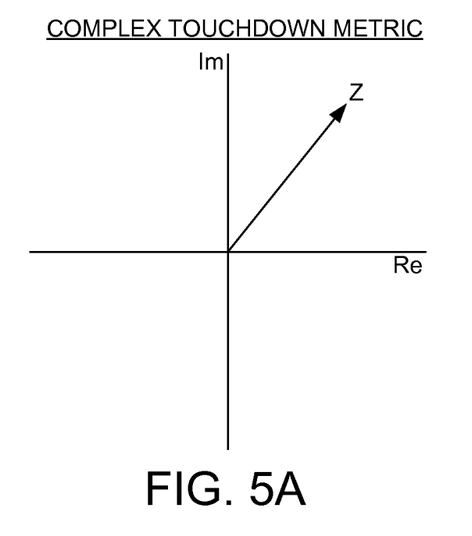
FIG. 5A shows an embodiment of the present invention wherein the touchdown metric comprises a vector Z comprising a magnitude and a phase, wherein the phase of the vector Z is relative to a phase of the DFH control signal.

FIG. 5A illustrates an embodiment of the present invention wherein the touchdown metric measured at block 14 of FIG. 1C comprises a vector Z having a magnitude and a phase, wherein the phase of the vector Z is relative to a phase of the DFH control signal 10. Evaluating the touchdown metric as a complex value (vector) relative to the DFH control signal 10 may provide a more accurate estimation of when a touchdown event occurs. That is, the phase of the touchdown metric relative to the DFH control signal 10 may provide additional information about when touchdown occurs, as well as help differentiate between different types of touchdown events. In one embodiment, a moving window of vectors Zs is evaluated to compute a standard deviation for the vectors, and then a touchdown threshold is computed based on the standard deviation.

Figure 5B:
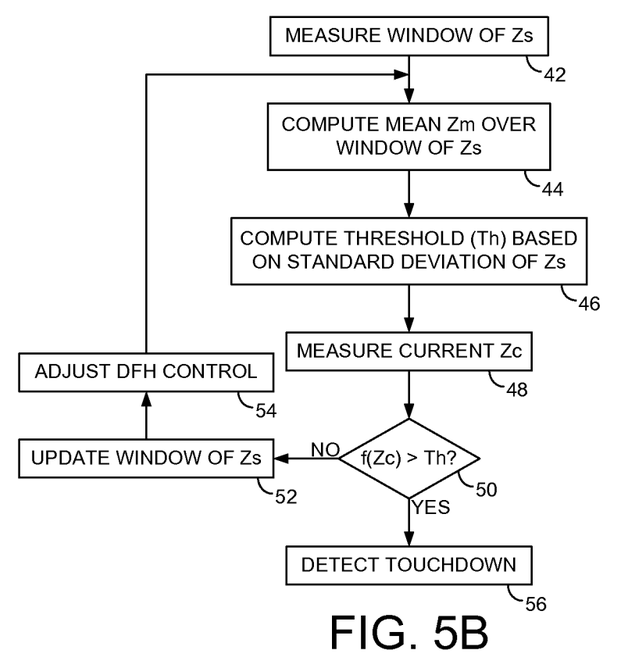
FIG. 5B is a flow diagram according to an embodiment of the present invention wherein a window of vector Zs is measured, a threshold is generated based on a standard deviation of the vector Zs, and a touchdown event is detected based on a current vector Zc and the threshold.

This embodiment is understood with reference to the flow diagram shown in FIG. 5B, wherein a plurality of the vectors Zs is measured over a window of time (block 42). A mean Zm of the vectors Zs is computed (block 44) which is used to compute the standard deviation of the vectors Zs. A threshold Th is then computed based on the standard deviation (block 46). When a current vector Zc is measured (block 48), a touchdown event is detected based on the current vector Zc and the threshold Th (block 50). For example, in one embodiment the threshold Th may be computed at block 46 as four times the standard deviation, and a touchdown event may be detected if a difference between the magnitude of the current vector Zc and the magnitude of the mean vector Zm exceeds the threshold Th at block 50. If a touchdown event is not detected at block 50, the window of Zs is updated based on the current vector Zc (block 52). The DFH control signal is then modified (block 54) such as by increasing the DC component, and the flow diagram is repeated starting from block 44 until a touchdown event is detected at block 56. In one embodiment, the DFH control signal may be adjusted at block 54 at a lower frequency rather than at every measured touchdown metric. For example, the DFH control signal may be adjusted after measuring N vectors without detecting a touchdown event at block 50.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk, the head comprising a dynamic fly height (DFH) actuator operable to control a fly height of the head over the disk; and
   control circuitry operable to:
      apply a DFH control signal to the DFH actuator to decrease the fly height of the head, wherein the DFH control signal comprises a DC component and an AC component comprising an excitation frequency;
      measure a touchdown metric over an interval; and
      detect the head contacting the disk in response to a frequency component of the touchdown metric at the excitation frequency,
      wherein the AC component comprises a periodic signal generated at a predetermined frequency high enough to attenuate a response of the DFH actuator.

2. The disk drive as recited in claim 1, wherein the DFH control signal is substantially zero for at least part of the interval while measuring the touchdown metric.

3. The disk drive as recited in claim 2, wherein the DFH control signal comprises a square wave comprising a plurality of pulses, wherein each pulse comprises the DC component and the AC component.

4. The disk drive as recited in claim 3, wherein the control circuitry is further operable to increase the DC component of the pulses until the touchdown metric indicates a touchdown event.

5. The disk drive as recited in claim 1, wherein the DFH control signal is non-zero during the interval while measuring the touchdown metric.

6. The disk drive as recited in claim 5, wherein the control circuitry is further operable to increase the DC component until the touchdown metric indicates a touchdown event.

7. The disk drive as recited in claim 1, wherein the control circuitry is further operable to calibrate the attenuation at the predetermined frequency.

8. The disk drive as recited in claim 7, wherein the control circuitry is operable to calibrate the attenuation by:
   applying a transient signal to the DFH actuator and measuring a fly height metric; and
   measuring a time constant of the DFH actuator based on the fly height metric.

9. The disk drive as recited in claim 1, wherein the control circuitry is further operable to generate an operating setting for the DFH control signal based on the DFH control signal that causes a touchdown event and the attenuation.

10. The disk drive as recited in claim 1, wherein the touchdown metric comprises a vector Z comprising a magnitude and a phase, wherein the phase of the vector Z is relative to a phase of the DFH control signal.

11. The disk drive as recited in claim 10, wherein the control circuitry is operable to:
measure a plurality of the vector Zs;
compute a threshold based on a standard deviation of the vector Zs;
measure a current vector Zc; and
detect the head contacting the disk based on the current vector Zc and the threshold.

12. A disk drive comprising:
a disk;
a head actuated over the disk, the head comprising a dynamic fly height (DFH) actuator operable to control a fly height of the head over the disk; and
control circuitry operable to:
apply a DFH control signal to the DFH actuator to decrease the fly height of the head, wherein the DFH control signal comprises a first periodic signal comprising a first frequency combined with a second periodic signal comprising a second frequency different from the first frequency;
measure a touchdown metric over an interval; and
detect the head contacting the disk in response to a first frequency component of the touchdown metric at a first excitation frequency and a second frequency component of the touchdown metric at a second excitation frequency.

13. The disk drive as recited in claim 12, wherein:
the DFH control signal comprises a square wave comprising a plurality of pulses at the first frequency; and
each pulse comprises an AC component at the second frequency.

14. A method of operating a disk drive comprising a head actuated over a disk, wherein the head comprises a dynamic fly height (DFH) actuator operable to control a fly height of the head over the disk, the method comprising:
applying a DFH control signal to the DFH actuator to decrease the fly height of the head, wherein the DFH control signal comprises a DC component and an AC component comprising an excitation frequency;
measuring a touchdown metric over an interval; and
detecting the head contacting the disk in response to a frequency component of the touchdown metric at the excitation frequency,
wherein the AC component comprises a periodic signal generated at a predetermined frequency high enough to attenuate a response of the DFH actuator.

15. The method as recited in claim 14, wherein the DFH control signal is substantially zero for at least part of the interval while measuring the touchdown metric.

16. The method as recited in claim 15, wherein the DFH control signal comprises a square wave comprising a plurality of pulses, wherein each pulse comprises the DC component and the AC component.

17. The method as recited in claim 16, further comprising increasing the DC component of the pulses until the touchdown metric indicates a touchdown event.

18. The method as recited in claim 14, wherein the DFH control signal is non-zero during the interval while measuring the touchdown metric.

19. The method as recited in claim 18, further comprising increasing the DC component until the touchdown metric indicates a touchdown event.

20. The method as recited in claim 14, further comprising calibrating the attenuation at the predetermined frequency.

21. The method as recited in claim 20, further comprising calibrating the attenuation by:
applying a transient signal to the DFH actuator and measuring a fly height metric; and
measuring a time constant of the DFH actuator based on the fly height metric.

22. The method as recited in claim 14, further comprising generating an operating setting for the DFH control signal based on the DFH control signal that causes a touchdown event and the attenuation.

23. The method as recited in claim 14, wherein the touchdown metric comprises a vector Z comprising a magnitude and a phase, wherein the phase of the vector Z is relative to a phase of the DFH signal.

24. The method as recited in claim 23, further comprising:
measuring a plurality of the vector Zs;
computing a threshold based on a standard deviation of the vector Zs;
measuring a current vector Zc; and
detecting the head contacting the disk based on the current vector Zc and the threshold.

25. A method of operating a disk drive, the disk drive comprising a head actuated over a disk, wherein the head comprises a dynamic fly height (DFH) actuator operable to control a fly height of the head over the disk, the method comprising:
applying a DFH control signal to the DFH actuator to decrease the fly height of the head, wherein the DFH control signal comprises a first periodic signal comprising a first frequency combined with a second periodic signal comprising a second frequency different from the first frequency;
measuring a touchdown metric over an interval; and
detecting the head contacting the disk in response to a first frequency component of the touchdown metric at a first excitation frequency and a second frequency component of the touchdown metric at a second excitation frequency.

26. The method as recited in claim 25, wherein:
the DFH control signal comprises a square wave comprising a plurality of pulses at the first frequency; and
each pulse comprises an AC component at the second frequency.

27. A disk drive comprising:
a disk;
a head actuated over the disk, the head comprising a dynamic fly height (DFH) actuator operable to control a fly height of the head over the disk; and
control circuitry operable to:
apply a DFH control signal to the DFH actuator to decrease the fly height of the head, wherein the DFH control signal comprises a DC component and an AC component comprising an excitation frequency;
measure a touchdown metric over an interval; and
detect the head contacting the disk in response to a frequency component of the touchdown metric at the excitation frequency,
wherein the DFH control signal is substantially zero for at least part of the interval while measuring the touchdown metric.

28. A method of operating a disk drive comprising a head actuated over a disk, wherein the head comprises a dynamic fly height (DFH) actuator operable to control a fly height of the head over the disk, the method comprising:
  applying a DFH control signal to the DFH actuator to decrease the fly height of the head, wherein the DFH control signal comprises a DC component and an AC component comprising an excitation frequency;
  measuring a touchdown metric over an interval; and
  detecting the head contacting the disk in response to a frequency component of the touchdown metric at the excitation frequency,
  wherein the DFH control signal is substantially zero for at least part of the interval while measuring the touchdown metric.

29. A disk drive comprising:
  a disk;
  a head actuated over the disk, the head comprising a dynamic fly height (DFH) actuator operable to control a fly height of the head over the disk; and
  control circuitry operable to:
    apply a DFH control signal to the DFH actuator to decrease the fly height of the head, wherein the DFH control signal comprises a DC component and an AC component comprising an excitation frequency;
    measure a touchdown metric over an interval; and
    detect the head contacting the disk in response to a frequency component of the touchdown metric at the excitation frequency,
  wherein the touchdown metric comprises a vector Z comprising a magnitude and a phase, wherein the phase of the vector Z is relative to a phase of the DFH control signal.

30. A method of operating a disk drive comprising a head actuated over a disk, wherein the head comprises a dynamic fly height (DFH) actuator operable to control a fly height of the head over the disk, the method comprising:
  applying a DFH control signal to the DFH actuator to decrease the fly height of the head, wherein the DFH control signal comprises a DC component and an AC component comprising an excitation frequency;
  measuring a touchdown metric over an interval; and
  detecting the head contacting the disk in response to a frequency component of the touchdown metric at the excitation frequency,
  wherein the touchdown metric comprises a vector Z comprising a magnitude and a phase, wherein the phase of the vector Z is relative to a phase of the DFH signal.

* * * * *